United States Patent
Jain et al.

(10) Patent No.: US 11,602,895 B2
(45) Date of Patent: Mar. 14, 2023

(54) SYSTEMS AND METHODS FOR HEATING LAYERS OF MATERIAL DEPOSITED USING ADDITIVE MANUFACTURING

(71) Applicant: Board of Regents, The University of Texas System, Austin, TX (US)

(72) Inventors: Ankur Jain, Arlington, TX (US); Hardikkumar Prajapati, Arlington, TX (US); Darshan Ravoori, Irving, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 163 days.

(21) Appl. No.: 16/841,528

(22) Filed: Apr. 6, 2020

(65) Prior Publication Data
US 2020/0316866 A1 Oct. 8, 2020

Related U.S. Application Data

(60) Provisional application No. 62/829,515, filed on Apr. 4, 2019.

(51) Int. Cl.
*B29C 64/295* (2017.01)
*B29C 64/209* (2017.01)
*B29C 64/314* (2017.01)
*B33Y 30/00* (2015.01)
*B33Y 10/00* (2015.01)

(52) U.S. Cl.
CPC .......... *B29C 64/295* (2017.08); *B29C 64/209* (2017.08); *B29C 64/314* (2017.08); *B33Y 10/00* (2014.12); *B33Y 30/00* (2014.12)

(58) Field of Classification Search
None
See application file for complete search history.

(56) References Cited

U.S. PATENT DOCUMENTS

2017/0334137 A1* 11/2017 Nystrom ............... B29C 64/393

* cited by examiner

*Primary Examiner* — Jacob T Minskey
*Assistant Examiner* — Adrien J Bernard
(74) *Attorney, Agent, or Firm* — Thomas Horstemeyer, LLP (57) ABSTRACT

In one embodiment, an additive manufacturing system includes a dispensing nozzle configured to dispense material to be used to manufacture a component, a barrel to which the nozzle is mounted, the barrel being configured to deliver the material to the dispensing nozzle, a barrel heater that surrounds the barrel, the barrel heater including a heating element configured to heat the barrel heater, the nozzle, and the material contained within the nozzle before it is dispensed from the nozzle, and a supplemental heater configured to heat previously deposited material so as to increase bonding and merging of the material that is being dispensed with the previously deposited material.

19 Claims, 5 Drawing Sheets

FIG. 8 his application claims priority to U.S. Provisional Application Ser. No. 62/829,515, filed Apr. 4, 2019, which is hereby incorporated by reference herein in its entirety.

SYSTEMS AND METHODS FOR HEATING LAYERS OF MATERIAL DEPOSITED USING ADDITIVE MANUFACTURING

CROSS-REFERENCE TO RELATED APPLICATION

This application claims priority to U.S. Provisional Application Ser. No. 62/829,515, filed Apr. 4, 2019, which is hereby incorporated by reference herein in its entirety.

BACKGROUND

Additive manufacturing (AM) has been widely investigated due to several key advantages offered over traditional manufacturing approaches. AM enables rapid manufacturing of complex geometries that are difficult or impossible to build with traditional manufacturing. This increased manufacturability has provided a significantly expanded design space for components. While early work on AM focused on building models and prototypes, it is now increasingly being used for building multifunctional parts expected to bear mechanical or thermal loads.

Given the increased interest in additively manufactured multifunctional parts, the thermal and mechanical properties of such parts and the impact of process parameters on these properties have been extensively studied. The polymer AM process involves the dispensing of a filament that is heated in a nozzle to a temperature greater than the glass transition temperature prior to dispensing. Following deposition, adjacent filaments merge into each other while cooling down. As the temperature approaches the glass transition temperature, the polymer becomes extremely viscous, thereby stopping neck growth between filaments. The thermally-driven neck growth and merging between filaments is the fundamental process that imparts mechanical strength and good thermal conductivity to the part. Experiments have shown that maintaining previously deposited layers at a high temperature results in improved inter-layer bonding. As a result, heat transfer during the filament deposition process plays a key role in determining overall properties of the part.

Infrared thermometry-based measurements of temperature distribution in the stand-off gap and around a deposited filament have been proposed. Temperature distribution around the deposited filament has been shown to be influenced by the thermal energy of the deposited filament, as well as heat transfer directly from the hot nozzle. Through both experiments and modeling, process parameters, such as print (scan) speed, filament diameter, etc., have been shown to play key roles in determining the rate of cooling of the filament. Both measurements and theoretical models show very rapid temperature drop in and around the filament, underscoring the critical need for optimizing heat transfer during polymer AM to ensure that the filament stays above glass transition and/or melting temperature for as long as possible.

The important role played by temperature and heat transfer in determining the properties of the printed part is also highlighted by investigations into post-process thermal annealing. A variety of experiments have reported significant enhancement in thermal and mechanical properties of polymer printed parts exposed to a high temperature for a certain time after printing. Both annealing time and temperature have been shown to influence the enhancement, which appears to occur due to improved neck growth between deposited layers when subjected to high temperature for a period of time.

Both sets of past work described above suggest the importance of maintaining a high temperature in and around the filament for as long as possible. Some possible process-related changes to enable this include increasing the nozzle temperature, reducing the thermal diffusivity of the filament material, and maintaining the build chamber at a high temperature. Clearly, there are practical limitations for these approaches, since, for example, thermal conductivity of the filament is fixed by the material choice and the nozzle temperature cannot be made too high because of undesirable changes in material properties at high temperature. Changing the print speed is also unlikely to be effective, as this has been shown not to influence the peak temperature or rate of temperature reduction and may actually inhibit neck growth between filaments.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to heat layers (e.g., filaments) of material deposited in an additive manufacturing (AM) process to improve layer-to-layer merging and bonding. Disclosed herein are systems and methods configured to provide such heating. In some embodiments, pre-heating of the deposited material is provided with a pre-heater that is positioned laterally and in front of the dispensing nozzle. In other embodiments, post-heating of the deposited material is provided with a post-heater that is positioned laterally and behind the dispensing nozzle. In still other embodiments, both pre-heating and post-heating of the deposited material are provided with a both a pre-heater and a post-heater or a combined pre-heater/post-heater.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

It has been determined that one approach to increasing the time duration with which deposited material remains at high temperature is to provide a hot surface in close proximity to the deposited material that travels along with the dispensing nozzle. Past work has already shown that heat transfer from the hot nozzle surface influences temperature distribution on the deposited layers (e.g., deposited filaments). Consequently, the presence of a hot surface that moves along with the nozzle may further increase temperature of deposited layers and keep the new layer currently being deposited by the nozzle at an elevated temperature for a longer time. Compared to other approaches that have been investigated, such as laser, infrared, and microwave heating, this approach is passive and simple to implement because, in most cases, a heating mechanism is already used to heat the nozzle barrel. This heating mechanism can be easily extended or supplemented to provide pre-heating and/or post-heating of deposited material without little further cost or complexity.

Described in this disclosure are experimental analyses of the heating of deposited layers of material using a hot surface that travels close to the deposited layer or "base" along with the dispensing nozzle. Several configurations can be used, including a pre-heating configuration in which the hot surface travels ahead of the nozzle (in terms of the print direction), a post-heating configuration in which the hot surface travels behind the nozzle (in terms of the print direction), and a pre-/post-heating configuration that incorporates both a pre-heater and a post-heater so as to obtain the benefit of both types of heating. Experiments were performed on pre- and post-heating configurations, and temperature measurements were collected. As expected, the pre-heating and post-heating configurations resulted in a significant temperature increase before and after filament deposition, respectively. The extent of the temperature increase was found to be a strong function of the distance (gap) between the bottom surface of the heater and the deposited material top surface, as well as the print speed. Cross-sectional imaging of printed parts clearly shows significant improvement using this approach on filament-to-filament neck growth.

Figure 1:
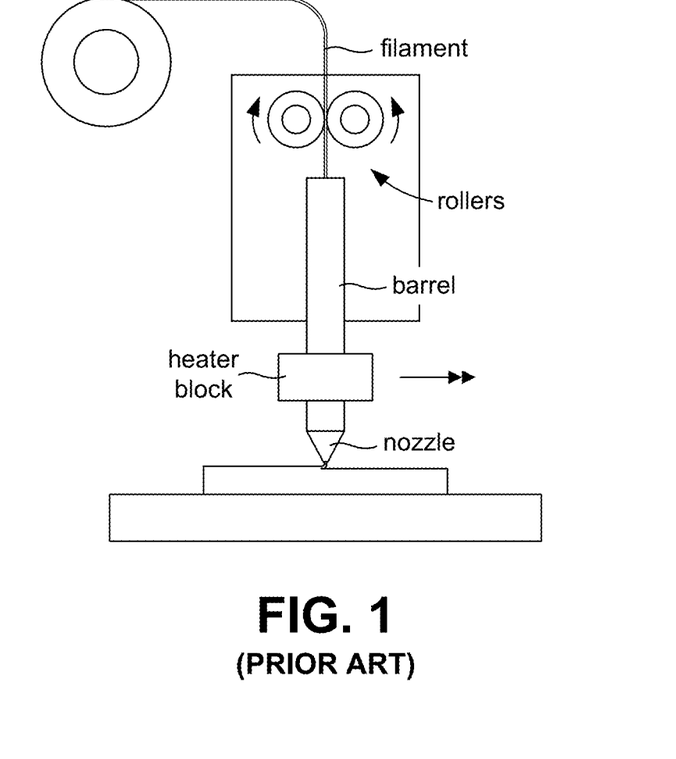
FIG. 1 is a schematic diagram of a prior art additive manufacturing system.
Figure 2A:
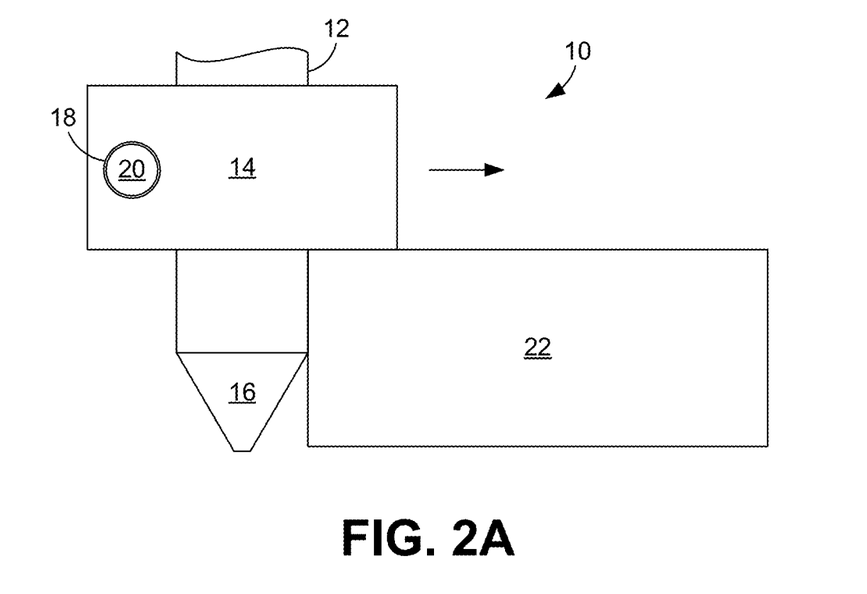
FIG. 2A is a schematic diagram of an embodiment of a novel additive manufacturing system.
Figure 2B:
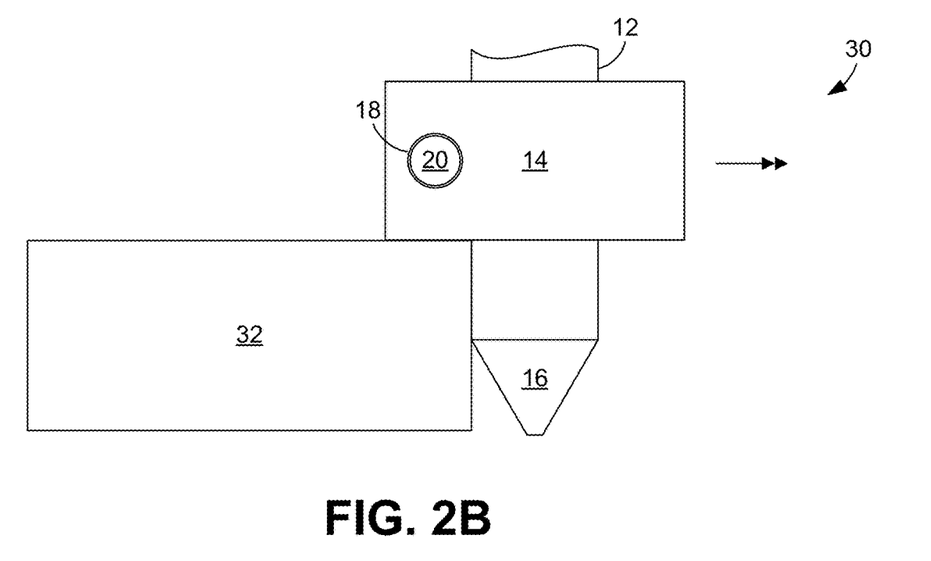
FIG. 2B is a schematic diagram of a further embodiment of a novel additive manufacturing system.
Figure 2C:
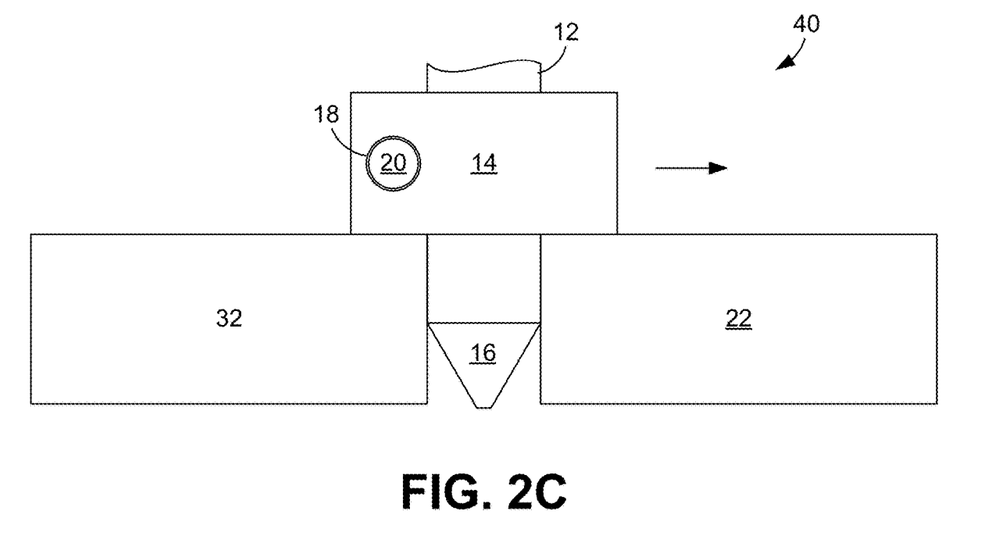
FIG. 2C is a schematic diagram of a further embodiment of a novel additive manufacturing system.

FIG. 1 illustrates an example prior art extrusion AM system. As is apparent from this figure, filament, such as polymer filament, is delivered through a barrel to a nozzle mounted to the distal (bottom) end of the barrel. Located upstream of (above) the nozzle (in terms of the feed direction of the filament through the barrel) is a barrel heater that heats the filament before it is dispensed from the tip of the nozzle. FIGS. 2A-2C illustrate modified extrusion AM systems in accordance with this disclosure that provide pre-heating, post-heating, or both for purposes of facilitating improved layer merging and bonding and, therefore, improved structural integrity of manufactured objects.

Beginning with FIG. 2A, a first embodiment of an extrusion AM system 10 is illustrated. As shown in the figure, the system 10 includes a barrel 12, a barrel heater 14 through which the barrel passes, and a dispensing nozzle 16 that is mounted to the distal (bottom) end of the barrel, in similar manner to the prior art system. The barrel 12 directs the filament to pass through the barrel heater 14, which is made of a thermally conductive material, such as a metal like aluminum or copper. As suggested by its name, the barrel heater 14 is configured to heat the barrel 12 of the system 10 so as to enable it to be deposited by the dispensing nozzle 16. In some embodiments, the barrel heater 14 can comprises a solid block of thermally conductive material, such as a metal like aluminum or copper. In such cases, the barrel heater 14 can be referred to as a barrel heater block.

In the illustrated embodiment, the barrel heater 14 includes a passage 18 (e.g., a drilled cylindrical bore) in which is provided a heating element 20 that generates heat and transfers it to the material of the heater primarily via conduction. In some embodiments, the heating element 20 comprises a cartridge heating element including a resistive heater that generates heat when an electrical current is provided to the element. As the barrel heater 14 is made of a thermally conductive material, and because the heating element 20 is in direct physical contact with the barrel heater, the heat generated by the heating element spreads throughout the entire barrel heater.

The dispensing nozzle 16 is configured to deposit the material (e.g., polymer material) delivered by the barrel 12 on either a work surface (if it is the first layer of material being deposited) or a previously deposited layer of material. As with the barrel 12 and the barrel heater 14, the nozzle 16 is made of a thermally conductive material, such as a metal like aluminum or copper. This way, heat within the barrel 14 is transferred to the nozzle 16, again, primarily through conduction.

Unlike prior art systems, the system 10 also includes a supplemental heater in the form of a pre-heater 22 that is positioned laterally (i.e., horizontally in the configuration of the figure) as well as "in front of" the dispensing nozzle 16 in terms of the print direction (i.e., direction of travel) of the nozzle (as identified by the arrow) during material dispensation. The pre-heater 22 can also comprise a solid block of thermally conductive material, such as a metal like aluminum or copper. In such a case, the pre-heater 22 can be referred to as a pre-heater block.

With further reference with FIG. 2A, the pre-heater 22 is in direct physical contact with the barrel heater 14 such that the heat within the barrel heater is transferred to and spreads throughout the pre-heater, again, primarily via conduction. Both the barrel heater 14 and the pre-heater 22 can reach an equilibrium temperature, which depends upon the material printing temperature. In some embodiments, that temperature ranges from approximately 150 to 600° C. when polymer material is being deposited. Notably, while the barrel heater 14 and the pre-heater 22 are shown as comprising separate blocks of material that are in contact with each other, in other embodiments the two blocks can instead comprise a unitary component that is made from the same piece of material. In addition to being in direct physical contact with the barrel heater 14, the pre-heater 22 is in direct physical contact with the barrel 12.

Regardless of its particular configuration, the pre-heater 22 provides pre-heating to one or more deposited layers of material as it is configured to heat the layer(s) upon which a new layer of material is about to be deposited, in essence "pre-heating" the deposited layer.

FIG. 2B illustrates second embodiment of an extrusion AM system 20. The system 30 is similar in several ways to the system 10. In particular, the system 30 includes the barrel 12, the barrel heater 14, and the dispensing nozzle 16, each of which can have a configuration the same as or similar to those described above in relation to FIG. 2A. In this embodiment, however, the system 30 includes a supplemental heater in the form of a post-heater 32 instead of a pre-heater. The post-heater 32 is positioned laterally as well as "behind" the dispensing nozzle 16 in terms of the print direction of the nozzle (as identified by the arrow) during material dispensation.

Like the pre-heater described above, the post-heater 32 can also comprise a solid block of thermally conductive material, such as a metal like aluminum or copper. In such a case, the post-heater 32 can be referred to as a post-heater block. Also like the pre-heater, the post-heater 32 is in direct physical contact with the barrel heater 14 such that the heat within the barrel heater is transferred to and spreads throughout the post-heater. As above, while the barrel heater 14 and the post-heater 32 are shown as comprising separate blocks of material that are in contact with each other, in other embodiments the two heaters can comprise a unitary component that is made from the same piece of material. In addition to being in directly physical contact with the barrel heater 14, the post-heater 32 can also be in direct physical contact with the barrel 12.

The post-heater 32 also provides heat to a deposited layer of material. In this case, however, the deposited layer of material is the material that was just dispensed from the dispensing nozzle 16, thereby providing "post-heating" to that layer.

FIG. 2C illustrates third embodiment for an extrusion AM system 40 that is a hybrid of the systems 10 and 30. In particular, the system 40 includes the barrel 12, the barrel heater 14, the dispensing nozzle 16, as well as both the pre-heater 22 shown in FIG. 2A and the post-heater 32 shown in FIG. 2B, which can have configurations that are the same as or similar to those described above. As before, while the pre- and post-heaters 22, 32 are shown as independent blocks of material, one or both of them can be unitarily formed with the barrel heater 14 (and/or with each other) from the same piece of material.

Irrespective of whether an extrusion AM system comprises a supplemental heater in the form of a pre-heater, post-heater, or both, each supplemental heater has a planar bottom surface (see FIGS. 2A-2C) that is placed in close proximity with one or more deposited layers of material so as to heat the material, primarily through radiation and convection, to facilitate material bonding. To ensure this result, the bottom surfaces of the supplemental heaters can be nearly even with the distal (bottom) tip of the nozzle in the vertical direction. In some embodiments, the bottom surfaces of the supplemental heaters are positioned approximately 0.5 to 3 mm higher than the distal tip of the nozzle so as to be close to the deposited layers without touching them. In some embodiments, the bottom surface(s) can be spaced from the top surface of the deposited layer by approximately 0.5 to 4 mm. This space is referred to herein as the "gap" or "air gap" between the supplemental heater and the top surface of the deposited layer. As can be appreciated from the disclosures provided above, the smaller the gap, the greater the amount of heat that is transferred to the deposited layers.

Experiments were performed on experimental systems similar to the systems 10, 30, and 40 illustrated in FIGS. 2A-2C and described above to measure the thermal effects of pre-heating and/or post-heating during material dispensing. One experimental system comprised a custom-built Anet A8 three-dimensional printer, a FLIR A6703sc InSb infrared camera, and a 6 mm thick polylactic acid (PLA) sample on which filaments were deposited. The aluminum build plate dimensions were 200 mm by 200 mm. Stepper motors for x, y, and z movement were controlled using an A-1284 mainboard. The geometry to be printed was modeled using CAD software and converted into G-code using Simplify3D software. A 1.75 mm diameter PLA filament was fed through a barrel heated with a barrel heater block and dispensed through a 0.4 mm brass nozzle. The filament feed rate was determined using Simplify3D software based on process parameters, such as print speed and layer height, in order to maintain consistent flowrate.

The standard barrel heater block positioned upstream of the nozzle was replaced with a custom-made aluminum heater block that included both the barrel heater block as well as a supplemental heater block. In particular, a single solid aluminum block was machined to form both blocks and then integrated with the nozzle and barrel assembly in order to obtain a pre-heating configuration similar to that shown in FIG. 2A (except that the supplemental heater block was unitarily formed with the barrel heater block. While only a single heater block was formed, the two portions of the block are still referred to as the "barrel heater block" and the "supplemental heater block." A threaded hole was drilled into the barrel heater block in order to accommodate the nozzle assembly and a 40 W cartridge heating element and a thermistor were embedded in the block.

The thermistor reading was used by the A1284 mainboard to control the heating current delivered to the cartridge heater in order to maintain a constant temperature in the nozzle as well as supplemental heater block. Due to the high thermal conductivity of aluminum block, the entire block was expected to reach the set temperature, which was validated through temperature measurements using an external thermocouple at the start of experiments. The supplemental heater block was 30 mm in length, 25 mm in width, and 10 mm in height. The planar bottom surface of the supplemental heater block was located just higher than the nozzle tip. Two different pre-heater samples spaced 0.6 mm and 1.6 mm between the bottom surface of the supplemental heater block and distal tip of the nozzle were constructed. In each experiment, the nozzle tip was positioned 0.35 mm above the surface on which the polymer material was to be dispensed. With that positioning, the bottom surface of the supplemental heater block was spaced 0.95 mm and 1.95 mm above the top surface of the deposited layer of material, respectively, for the two pre-heater samples.

It is noted that that the supplemental heater block of the experimental system was used for both pre-heating and post-heating experiments as the nozzle was rastered (scanned) in both a first direction as well as an opposite, second direction. When the nozzle was moved in the first direction in which the supplemental heater block was in front of the nozzle, the block acted as a pre-heater block. However, when the nozzle was moved in a direction in which the supplemental heater block was "behind" the nozzle (in terms of movement in the first direction), the block acted as a post-heater block. In addition, a combined pre-heater/post-heater embodiment was also fabricated by bolting two separately machined aluminum heater blocks together to form a configuration similar to that shown in FIG. 2C.

A 6 mm PLA block was printed using the process described above with both the pre-heating and post-heating configurations. For reference, a baseline process using only the conventional barrel heater block was also performed. Experiments were performed at print speeds of 2.7, 4.1, 10.4, and 21.6 mm/s for both the 0.95 mm and the 1.95 mm gap configurations. In each case, the nozzle and heater blocks were maintained at 205° C. through Joule heating provided by the 40 W cartridge heating element.

The infrared camera used in the experiments measured infrared emission in the 3.0 to 5.0 μm wavelength range. The measured radiation field was converted to a temperature field through the emissivity of the surface being measured. The camera was placed around 5 cm from the field of view in which the hot, moving nozzle dispensed the new PLA layer. The temperature field was measured at a rate of 30 frames per second (fps). Since the accuracy of infrared-based temperature measurement depends on the quality of calibration, an extensive calibration was performed in advance of the experiments. The infrared camera was used to measure the temperature of a PLA sample maintained at a number of well-known temperatures using an Instec HCS622V thermal stage. The emissivity of the PLA was determined as the value that results in best agreement between the known set temperatures and measured temperatures by the infrared camera in the calibration measurements. A determined emissivity of 0.92 was used throughout the experiments.

Figure 3A:
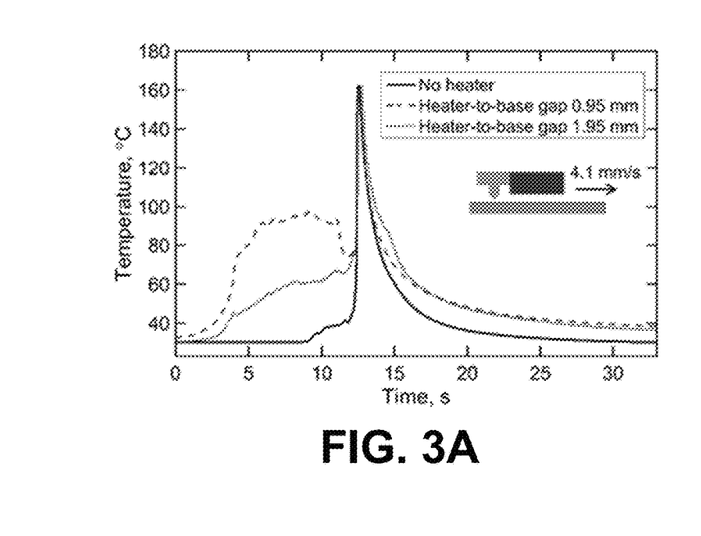
FIG. 3A is a graph that shows measured temperature as a function of time at a fixed point on the print line for the pre-heating configuration for two different heater-base gaps.

The effect of the pre-heating and post-heating configurations on the temperature distribution along the print line was studied through a number of experiments. FIG. 3A is a graph that shows the temperature measurement at a fixed location on the print line as a function of time in the pre-heating configuration, in which the supplemental heater block traveled ahead of the dispensing nozzle. In this graph, temperature is plotted for two different supplemental heater block-to-layer gaps, i.e., 0.95 mm and 1.95 mm, at a fixed print speed of 4.1 mm/s. For comparison, temperature measurements corresponding to the baseline case without pre-heating at the same print speed is also plotted. In each of the three cases plotted in FIG. 3A, temperature rose slowly as the nozzle approached the point of interest, followed by a sharp rise and peak corresponding to the time at which the PVA was dispensed at the point of interest. Subsequently, there was a gradual decline in temperature as the nozzle moved away from the point of interest. These characteristics are all consistent with measurements reported in the past, as well as with theoretical predictions from moving heat-source theory.

The impact of the pre-heating configuration can be clearly seen in the two plots corresponding to pre-heating configurations in FIG. 3A. Both show a significant increase in temperature even prior to arrival of the nozzle. The two plateaus in FIG. 3A correspond to additional pre-heating caused by the pre-heating configuration that arrives at the point of interest prior to the nozzle. After the nozzle has passed the point of interest, the temperature reduces for all three cases following the same general trend. There is some additional temperature increase in the two curves corresponding to the pre-heating configurations compared to the baseline, which is likely due to diffusion of thermal energy absorbed from the supplemental pre-heater block even before nozzle arrival.

FIG. 3A also shows that the temperature increase due to pre-heating configuration as a function of the heater-to-layer gap. In the two studied cases, the smaller gap resulted in a higher temperature rise, which was expected because of increased convection and radiation heat transfer between the pre-heater surface and the print plane. FIG. 3A provides evidence of enhanced temperature rise due to the pre-heating configuration, which may be expected to result in increased filament-to-filament bonding.

Figure 3B:
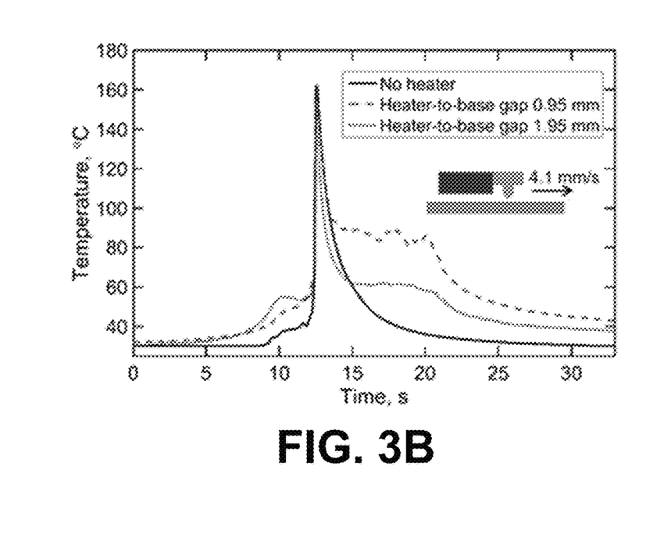
FIG. 3B is a graph that shows measured temperature as a function of time at a fixed point on the print line for the post-heating configuration for two different heater-base gaps.

Similar experiments were also performed to understand the thermal impact of the post-heating configuration. A fixed print speed of 4.1 mm/s and heater-to-layer gaps of 0.95 mm and 1.95 mm were utilized, similar to FIG. 3A. Post-heating configuration data are plotted in FIG. 3B, along with a baseline case with no supplemental heating. The impact of the post-heating configuration on temperature distribution after filament dispense can be clearly seen in FIG. 3B. There is greater temperature rise for the lower gap case, as expected, due to greater rate of conduction and radiative heat transfer enabled by the small gap. The post-heating configuration did not significantly impact temperature before filament dispense because minimal heat transfer occurred at the point of interest until the nozzle has passed and the post-heater appears above the point. This is similar to the pre-heating configuration case, in which there was relatively lower impact of temperature after filament dispense.

Figure 4A:
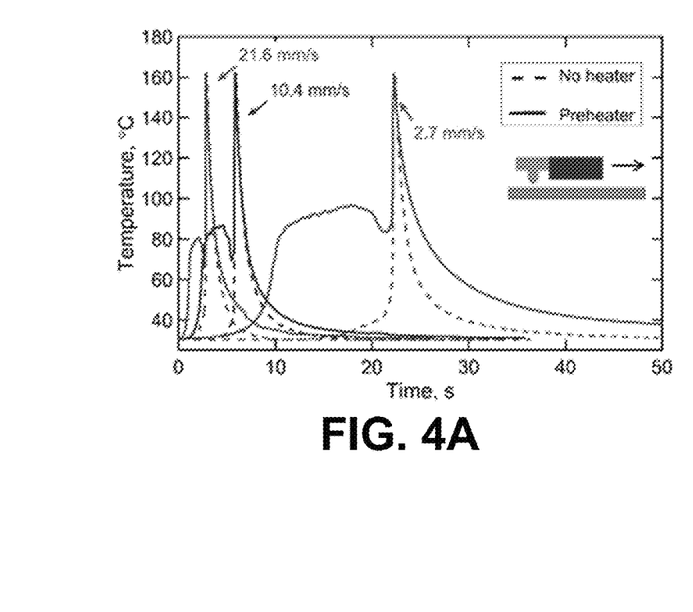
FIG. 4A is a graph that shows measured temperature as a function of time at a fixed point on the print line for the pre-heating configuration for two different print speeds.

To further understand the thermal impact of the pre-heating and post-heating configurations, experiments were performed for the two configurations at multiple print speeds. FIG. 4A plots temperature as a function of time at a fixed point on the print line for the pre-heating configuration at three different print speeds. The heater-to-layer gap was fixed at 0.95 mm. Measurement for the baseline case without pre-heating was also plotted for comparison. Similar to FIG. 3A, at each print speed a significant temperature plateau is observed prior to the peak, while the peak temperature does not change much. The area under the temperature-time curve, which roughly corresponds the total thermal dose or energy transferred into the deposited layers, is significantly increased by the use of the pre-heater, particularly at low print speeds. This is because, at low print speeds, the point of interest is exposed to the hot pre-heater surface for a longer time, which results in a greater width of the plateau region in FIG. 4A prior to the temperature peak. This indicates that a lower print speed may result in greater duration of elevated temperature prior to filament dispense. The width of this region in all three cases was found to be close to the expected value based on the print speed in each case and the width of the pre-heating configuration. Following the temperature peak at the time of filament dispense, the temperature gradually reduced with greater deviation between the two at lower print speeds. This was likely due to greater thermal energy absorbed in the greater time of exposure at lower print speeds.

Figure 4B:
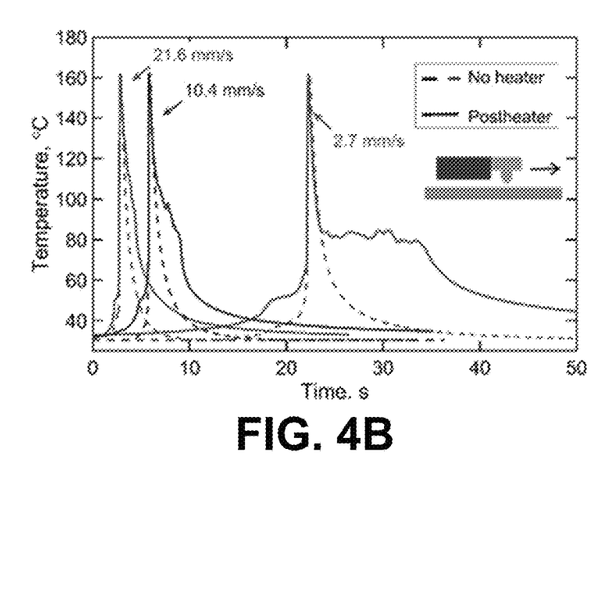
FIG. 4B is a graph that shows measured temperature as a function of time at a fixed point on the print line for the post-heating configuration for two different print speeds.

FIG. 4B plots experimental data from similar experiments in the post-heating configuration at three different print speeds. As expected, in these cases, increased temperature rise is observed after the nozzle has passed over the point of interest because, in this case, the post-heater trailed behind the nozzle and heated the point of interest after filament dispense. Similar to FIG. 3B, a relatively lesser impact is observed before filament dispense, and an elevated plateau in the temperature plot after filament dispense is found to be the highest for the lowest print speed investigated in these experiments.

Figure 5A:
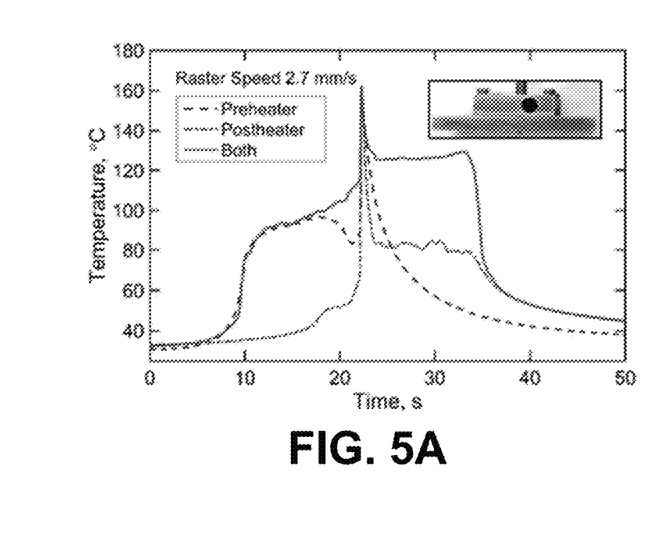
FIG. 5A is a graph that shows temperature plots comparing the impact of pre-heater and post-heating configurations with a hybrid pre-/post-heating configuration for a print speed of 2.7 mm/s.
Figure 5B:
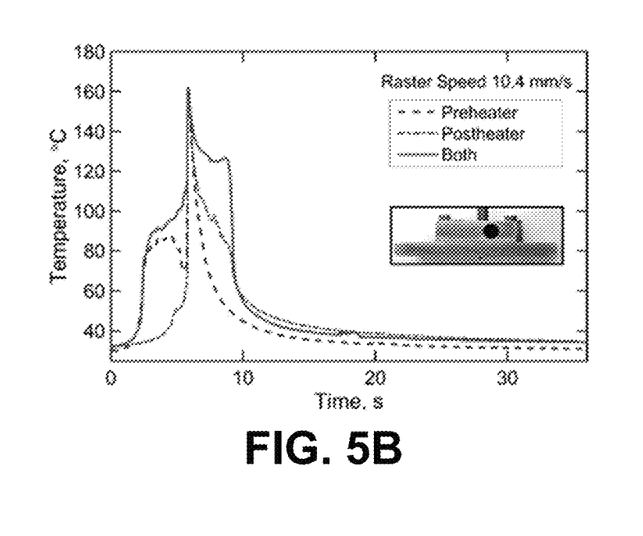
FIG. 5B is a graph that shows temperature plots comparing the impact of pre-heater and post-heating configurations with a hybrid pre-/post-heating configuration for a print speed of 10.4 mm/s.

Finally, experiments were performed for a combined pre-heating and post-heating configuration (i.e., pre-/post-heating). A comparison of the combined configuration with pre-heater-only and post-heater-only is presented in FIGS. 5A and 5B for two different print speeds. These plots show that the presence of both configurations results in significant increase in temperature at the point of interest both before and after filament dispense. The pre-/post-heating configuration offers the benefits of both individual configurations. As expected, time duration for which increased temperature is observed is lower for higher print speeds (FIG. 5A vs. FIG. 5B), which is explained by the shorter exposure time at a higher print speed. The provisioning of both pre-heating and post-heating incurred only incremental cost and complexity as compared to pre-heating or post-heating alone. The heating current is expected to nominally increase due to the increased thermal mass to be maintained at a high temperature, but otherwise, this represents a passive approach for obtaining significant benefits in layer-to-layer bonding.

While the thermal impact of the pre-heater does not extend much beyond its footprint, the effect is highly directed and precisely heats the region at which the material is about to be dispensed. Further, the size of the pre-heater and/or post-heater can be changed in order to change the size of the zone of thermal influence. As the pre-heater/nozzle assembly moves from left to right, the heated zone on the base surface also moves. The pre-heater effectively preheats the deposited layer before the new layer is dispensed, which may be effective for promoting layer-to-layer adhesion.

One important motivation behind the design of the pre-heating and post-heating configurations is to supply supplemental thermal energy to the print lines and therefore increase the effectiveness of merging between adjacent filaments. While FIGS. 3-8 clearly present evidence of increased temperature along the print line due to the pre-heating and post-heating configurations, further experiments were also performed to investigate the effect of this temperature rise on the filament neck growth.

Samples of size 40 mm by 40 mm by 10 mm were printed with combined pre-heating and post-heating configurations, as well as the nozzle-only baseline case. In order to reveal the layer (deposited filament) cross-section in each case, the printed samples were cut using liquid nitrogen. Briefly, the samples were dipped in liquid nitrogen for 10 minutes, followed by impact load on a notch, which resulted in a clean cut of the sample without blurring of the cross-section that would have occurred in case of a heat-generating cutting process such as sawing.

Figure 6A:
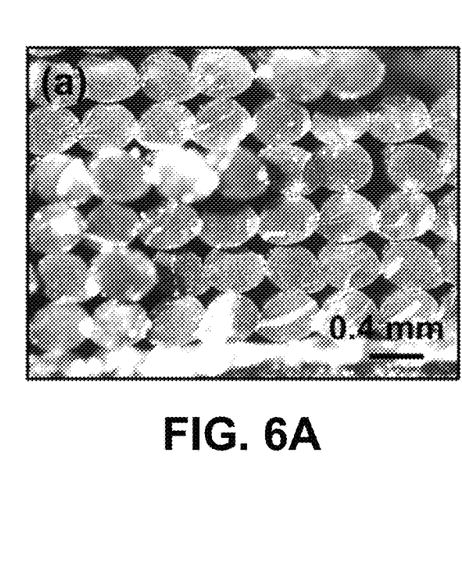
FIG. 6A is a cross-sectional image showing filament-to-filament bonding for a baseline case (i.e., no pre- or post-heating).
Figure 6B:
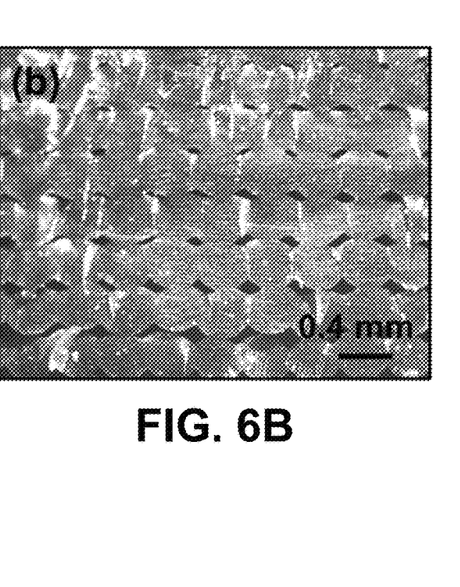
FIG. 6B is a cross-sectional image showing filament-to-filament bonding for a case with pre- and post-heating.

FIG. 6 presents cross-sectional images for the baseline case and for a combined pre-/post-heating configuration at a 60 mm/s print speed with a 0.95 mm gap from the heater surface and deposited layer. FIG. 6A shows results for the baseline case (i.e., conventional AM) while FIG. 6B shows results with the addition of pre- and post-heating. These images clearly show increased layer-to-layer necking due to the thermal effect of the pre-heater and post-heating configurations.

While the experiments with single printed lines revealed a difference between pre-heating and post-heating configurations, it should be recognized that such a distinction may not exist in practical scenarios in which multiple lines are being sequentially printed. This is because the nozzle typically travels in a U configuration, so that when one line is printed from left to right, the next is printed from right to left. This results in the pre-heating configuration in the first line effectively and a post-heating configuration in the next line when the travel direction of the nozzle reverses. Therefore, it is expected that even a single supplemental heater may result in combined pre-heater/post-heating effects. Due to the simplicity of the design of the heating mechanism, it is possible to include both pre-heating and post-heating configurations, such as shown in FIG. 2C, in order to maximize the thermal benefit without much additional cost or effort.

While pre- and post-heating are described herein, it is noted that the supplemental heater(s) can not only be positioned in front of and/or behind the dispensing nozzle, the heater(s) can further extend to the sides of the nozzle. For example, a single supplemental heater could surround the nozzle on all sides to as to provide sufficient heating of the deposited layers.

Figure 7:
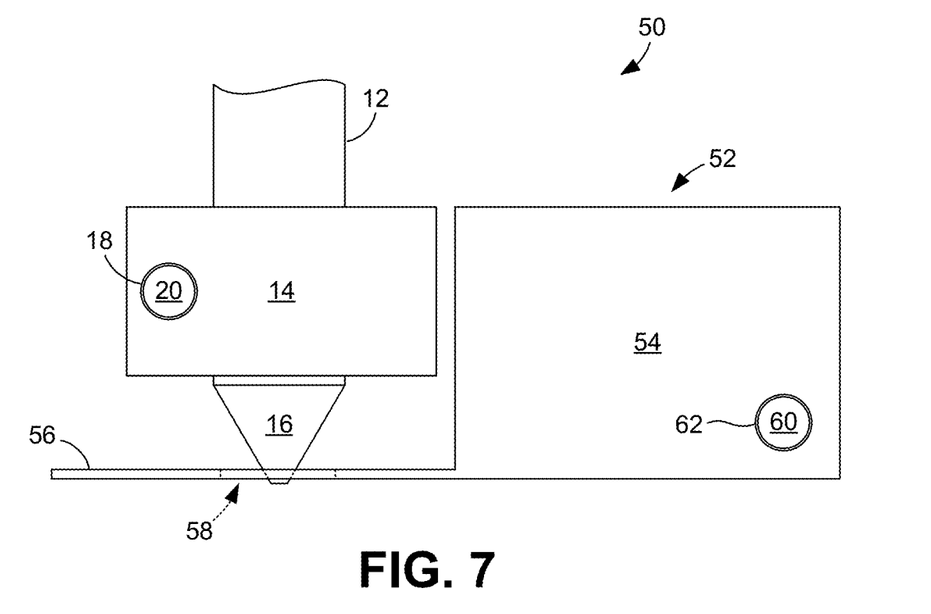
FIG. 7 is a schematic diagram of a further embodiment of a novel additive manufacturing system.

In the embodiments described above, the supplemental heaters were heated because of their direct physical contact with the barrel heater, which comprised a heating element. In other embodiments, an independently controlled supplemental heating element can be used to heat the supplemental heater. In such embodiments, the supplemental heater need not be in direct physical contact with the other heated components. FIG. 7 illustrates an embodiment in which such a supplemental heating element is used.

With reference to FIG. 7, an extrusion AM system 50 is similar to the other disclosed systems. Accordingly, the system 50 includes the barrel 12, the barrel heater 14, and the dispensing nozzle 16, each of which can have a configuration the same as or similar to those described above. The system 50 also includes a supplemental heater 52. In this embodiment, however, the supplemental heater 52 is separate from the other heated components and makes no contact with them. In addition, the supplemental heater 52 has its own independent heat source and travels with the dispensing nozzle 16 at the same print speed.

With further reference to FIG. 7, the supplemental heater 52 comprises a body 54 that is positioned in front the nozzle 16 and an extension 56 that extends laterally from the body. In some embodiments, the body 54 and extension 56 are unitarily formed from a single piece of thermally conductive material, such as a metal like aluminum or copper. The body 54 can comprise a solid block of material, whereas the extension 56 can comprise a thin, horizontal planar plate. An opening 58 is provided within the extension 56 at a position at which the nozzle 16 can extend through the opening without touching the extension. In addition, the supplemental heater 52 comprises its own heating element and temperature sensor 60 provided within a passage (e.g., drilled bore) 62. As before, the heating element can be a cartridge heating element comprising a resistive heater. By way of example, the temperature sensor can be a thermocouple.

With such a configuration, in which the supplemental heater 52 does not contact the other heated components, the supplemental heater can be heated to a different temperature than the barrel heater 14 and the nozzle 16. This configuration helps overcome the thermal resistance of the air gap that exists between the bottom surface of the supplemental heater 52 and the deposited layer(s). In some cases, the deposited layer(s) can be heated to substantially the same temperature as the nozzle 16. This can be achieved by heating the supplemental heater 52 to a temperature that is approximately 5 to 100% greater than the temperature of the barrel 14 and nozzle 16.

Figure 8:
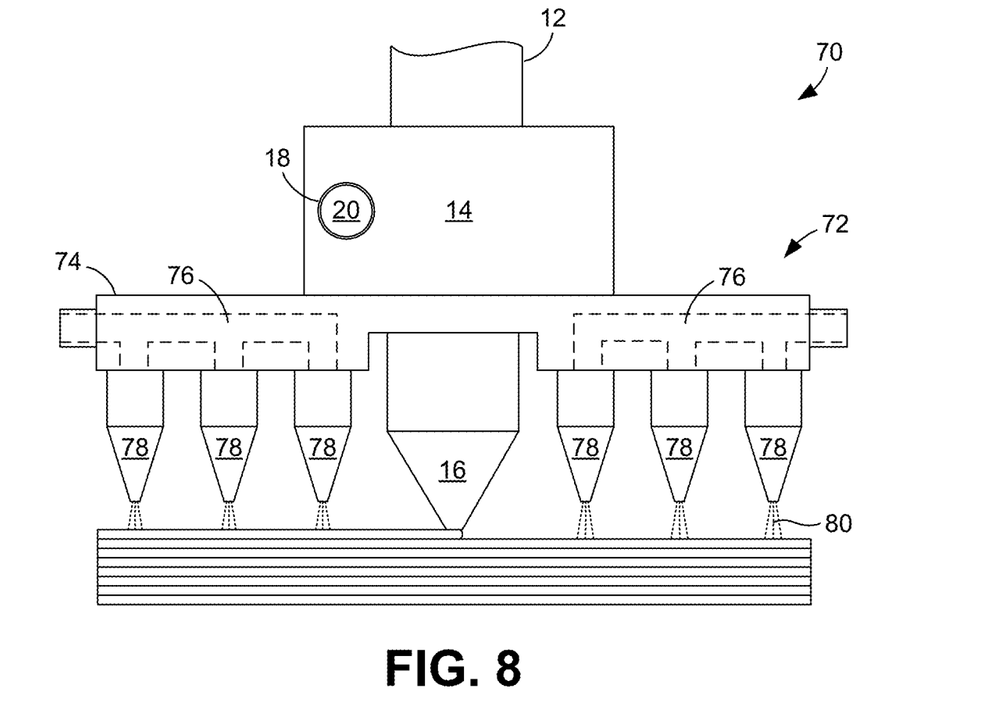
FIG. 8 is a schematic diagram of a further embodiment of a novel additive manufacturing system.

It is also noted that other forms of pre- and post-heating can be used to obtain improved results. For example, FIG. 8 illustrates an extrusion AM system 70 in which hot air is blown onto the deposited layer(s) in a pre and post-heating scenario. As shown in FIG. 8, the system 70 also includes the barrel 12, the barrel heater 14, and the dispensing nozzle 16, each of which can have a configuration the same as or similar to those described above. The system 70 also includes a supplemental heater 72 that is in direct physical contact with both the barrel heater 14 and the barrel 12. The supplemental heater 72 comprises a body 74 that can also comprise a solid block of thermally conductive material, such as a metal like aluminum or copper. Formed within the body 74 are one or more internal air passages 76 through which air can be driven by a suitable source (e.g., air pump or pressurized air canister). This air can be delivered to multiple air nozzles 78 that extend downward from the body 74 both before and after the dispensing nozzle 16. As the air passes through the body 74, it is heated due to heating of the body because of its direct physical contact with the barrel heater 14. Therefore, heated jets of air 80 are ejected from the air nozzles 78 and onto the deposited layer(s) to both pre- and post-heat them. By way of example, the air nozzles 78 can be flat nozzles with a spread angle of 30 degrees.

The invention claimed is:

1. An additive manufacturing system comprising:
    a dispensing nozzle configured to dispense material to be used to manufacture a component;
    a barrel to which the nozzle is mounted, the barrel being configured to deliver the material to the dispensing nozzle;
    a barrel heater comprising a solid block of a thermally conductive material that surrounds the barrel, the barrel heater block including a heating element configured to heat the barrel heater block, the dispensing nozzle, and the material contained within the nozzle before it is dispensed from the nozzle; and
    a supplemental heater comprising a solid block of thermally conductive material, the supplemental heater block being configured to heat previously deposited material so as to increase bonding and merging of the material that is being dispensed with the previously deposited material, the supplemental heater block being in direct physical contact with the barrel heater block such that heat within the barrel heater block is transferred to the supplemental heater block by conduction.

2. The system of claim 1, wherein the supplemental heater block includes a planar bottom surface that is located at a vertical position that is nearly even with a distal tip of the nozzle so as to positioned close to a top surface of the previously deposited material.

3. The system of claim 2, wherein the planar bottom surface of the supplemental heater block is positioned approximately 0.5 to 3 mm higher than the distal tip of the nozzle.

4. The system of claim 2, wherein the planar bottom surface of the supplemental heater block is spaced from the top surface of the previously deposited material by approximately 0.5 to 4 mm.

5. The system of claim 1, wherein the supplemental heater block is a pre-heater that is positioned in front of the dispensing nozzle in terms of the nozzle direction of travel.

6. The system of claim 1, wherein the supplemental heater block is a post-heater that is positioned behind the dispensing nozzle in terms of the nozzle direction of travel.

7. An additive manufacturing system comprising:
    a dispensing nozzle configured to dispense material to be used to manufacture a component;
    a barrel to which the nozzle is mounted, the barrel being configured to deliver the material to the dispensing nozzle;
    a barrel heater block comprising a solid block of a thermally conductive material that surrounds the barrel, the barrel heater including a heating element configured to heat the barrel heater, the nozzle, and the material contained within the nozzle before it is dispensed from the nozzle; and
    a supplemental heater configured to heat previously deposited material so as to increase bonding and merging of the material that is being dispensed with the previously deposited material, wherein the supplemental heater comprises a solid block of thermally conductive material that is spaced from the barrel heater block and the dispensing nozzle and a plate that extends horizontally from the block and surrounds the nozzle, wherein no part of the supplemental heater physically contacts the barrel, barrel heater block, or nozzle.

8. The system of claim 7, wherein the plate of the supplemental heater has an opening through which the dispensing nozzle extends without contacting the plate.

9. The system of claim 7, further comprising a supplemental heating element provided within the block of the supplemental heater that enables the supplemental heater block to be heated by the supplemental heating element to a temperature that is different from the temperature of the dispensing nozzle.

10. The system of claim 7, wherein the block and the plate of the supplemental heater share a planar bottom surface that is located at a vertical position that is nearly even with a distal tip of the nozzle so as to positioned close to a top surface of the previously deposited layer.

11. The system of claim 10, wherein the planar bottom surface of the supplemental heater is positioned approximately 0.5 to 3 mm higher than the distal tip of the nozzle.

12. The system of claim 10, wherein the planar bottom surface of the supplemental heater is spaced from the top surface of the previously deposited layer by approximately 0.5 to 4 mm.

13. An additive manufacturing system comprising:
    a dispensing nozzle configured to dispense material to be used to manufacture a component;
    a barrel to which the nozzle is mounted, the barrel being configured to deliver the material to the dispensing nozzle;
    a barrel heater block comprising a solid block of a thermally conductive material that surrounds the barrel, the barrel heater including a heating element configured to heat the barrel heater, the nozzle, and the material contained within the nozzle before it is dispensed from the nozzle; and
    a supplemental heater configured to heat previously deposited material so as to increase bonding and merging of the material that is being dispensed with the previously deposited material, wherein the supplemental heater comprises a block of thermally conductive material in direct physical contact with the barrel heater block and one or more air nozzles that extend downward from the supplemental heater block toward the previously deposited material, wherein the supplemental heater block includes one or more internal passages configured to deliver air to the one or more air nozzles.

14. The system of claim 1, wherein the supplemental heater block comprises no heating means of its own and is solely heated by the barrel heater block.

15. The system of claim 1, wherein the supplemental heater block is unitarily formed with the barrel heating block from the same piece of material.

16. The system of claim 7, wherein the supplemental heater block comprises a supplemental heating element configured to heat the supplemental heater block.

17. The system of claim 16, wherein the supplemental heating element is provided in a passage formed in the supplemental heating block.

18. The system of claim 13, wherein the system comprises no heating means other than the heating element of the barrel heating block and wherein the air that exits the one or more air nozzles is heated solely by the supplemental heating block, which, in turn, is heated solely by the barrel heating block.

19. The system of claim 13, wherein there is at least one air nozzle in front of the dispensing nozzle and at least one air nozzle behind the dispensing nozzle in terms of the direction of travel of the dispensing nozzle.

* * * * *